(12) United States Patent
Reitz

(10) Patent No.: US 8,133,023 B2
(45) Date of Patent: Mar. 13, 2012

(54) WIND TURBINE WITH VARIABLE AREA PROPELLER BLADES

(75) Inventor: Elliott Reitz, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 403 days.

(21) Appl. No.: 12/417,895

(22) Filed: Apr. 3, 2009

(65) Prior Publication Data
US 2010/0254812 A1    Oct. 7, 2010

(51) Int. Cl.
  *F03D 7/04* (2006.01)
(52) U.S. Cl. .......... 416/1; 415/1; 415/4.1; 415/4.3; 415/4.5; 415/19; 415/21; 415/30; 415/34; 415/908; 416/23; 416/37; 416/41; 416/87; 416/89; 416/131; 416/147; 416/223 R; 416/226
(58) Field of Classification Search ............ 415/1, 4.1, 415/4.3, 4.5, 19, 21, 30, 34, 908; 416/1, 416/23, 37, 41, 87, 89, 131, 147, 223 R, 226
See application file for complete search history.

(56) References Cited

U.S. PATENT DOCUMENTS

| | | | |
|---|---|---|---|
| 4,877,374 A | 10/1989 | Burkett | |
| 5,328,329 A | 7/1994 | Monroe | |
| 5,570,997 A * | 11/1996 | Pratt | ............... 416/117 |
| 6,413,127 B1 | 7/2002 | Quaeck | |
| 6,662,449 B2 | 12/2003 | Rode | |
| 2001/0056433 A1 | 12/2001 | Adelson et al. | |
| 2003/0220029 A1 | 11/2003 | Quaeck | |
| 2005/0036888 A1* | 2/2005 | Miyazaki | ............. 416/132 B |
| 2008/0240923 A1 | 10/2008 | Bonnet | |

* cited by examiner

*Primary Examiner* — Asok Sarkar
(74) *Attorney, Agent, or Firm* — Howard IP Law Group, PC

(57) ABSTRACT

An apparatus and method for reducing wind turbine damage includes a propeller having a plurality of blades projecting radially from a hub. The blades may be adjustably combined to form variable cross-sections that either increase or decrease propeller rotation speed dependent on wind speed and weather conditions.

20 Claims, 19 Drawing Sheets

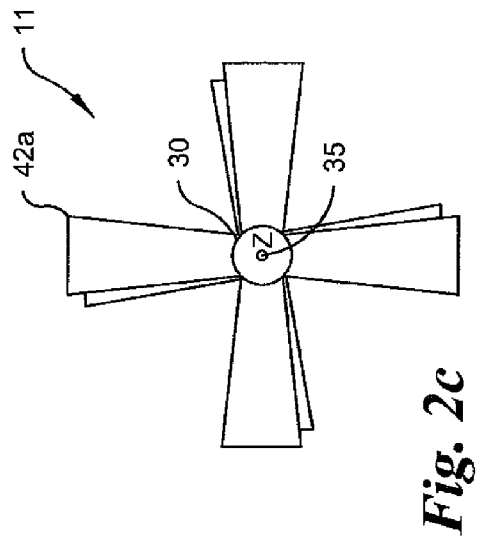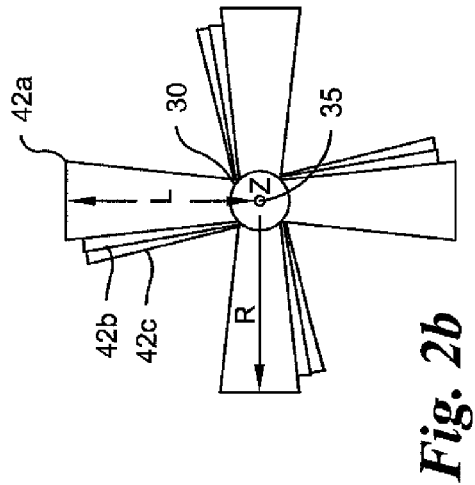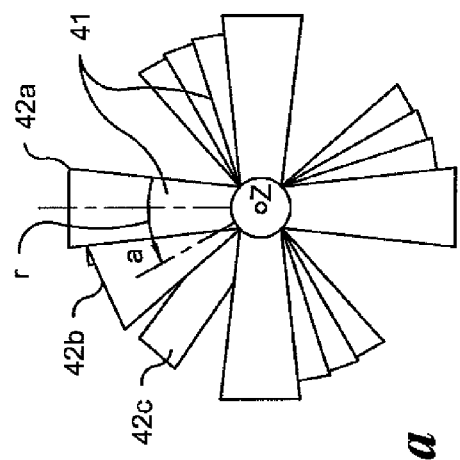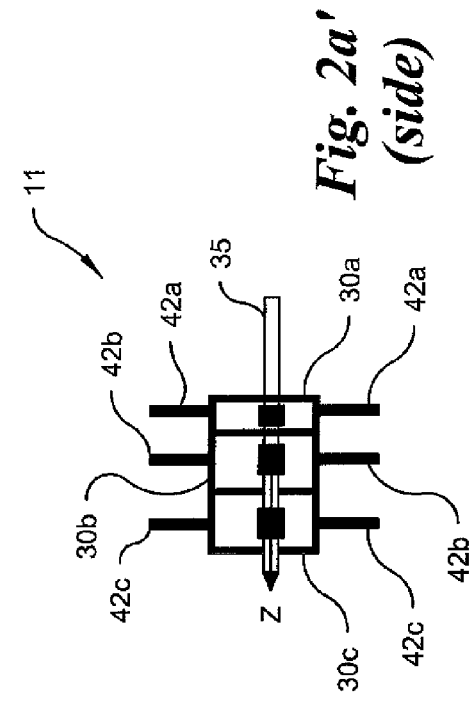

WIND TURBINE WITH VARIABLE AREA PROPELLER BLADES

FIELD OF INVENTION

The present invention relates to wind turbine propellers and is more particularly directed to a variable area blade apparatus that prevents damage dependent on wind velocities while maximizing the power output from the wind turbine.

BACKGROUND

Wind turbines, such as the conventional windmill, are used in the generation of power. In various geographic regions of the world, these machines experience a very wide range of wind conditions, some of which may destroy the propeller system. FIG. 1 illustrates a prior art wind turbine 10 and a support base 20 having a propeller 11 with blades 42 mounted on a hub 30 for rotating about a hub axle 35 that connects to a generator 40. The blades are canted in a direction that produces a maximum torque and rotational velocity when the wind velocity is perpendicular to the propeller 11. Typically this angle is 45 degrees. High wind speeds can cause damage to wind turbine blades 42. To reduce the likelihood of damage some wind turbines have relatively small diameter blades and an off-set shaft with angled tail mounting that aims (furls) the propeller in a direction parallel to sustained heavy crosswinds. While such configuration has proven effective to combat sustained heavy winds, strong cross wind gusts often destroy these structures.

Power generation wind turbines use low surface area propellers. These devices, however, exhibit very poor performance during low wind conditions. Therefore, locations where winds are reliably sustained, such as upon a hill-top for example, become necessary locations for these structures to produce any power most of the time. The power generation wind turbines typically feature three blades with small areas. However, at low wind speed little or no power is produced. In some prior art systems a variable blade pitch accommodates high-speed operation, but does not work well at low speed where traction on the air medium is most needed. Conventionally, a wind turbine will have a mechanical means to cause the entire rotor to turn to a position where the plane of rotation of the blades is parallel to the direction of the wind when the wind velocity becomes excessive. This manner of operation tends to reduce the risk of damage under high, steady wind conditions, but proves inadequate to compensate for abrupt changes in wind direction, such as during storms or other severe weather conditions. A wind turbine propeller that reliably performs under low wind conditions to produce optimum power and yet avoids destruction to the blades under high wind conditions or abrupt wind changes is desired.

SUMMARY OF THE INVENTION

The present invention relies in part on recognition of the aforementioned concerns and provides an apparatus and method directed to a variable area wind turbine propeller for preventing damage to the propeller dependent on wind velocities while increasing the power output of the wind turbine during periods of low wind.

According to an aspect of the present invention a wind turbine propeller includes: a plurality of overlapping blades projecting radially from a hub, the hub pivotally adapted to rotate about a hub axle for varying the cross section of the overlapping blades, wherein at least some of the overlapping blades combine to form a variable cross-section dependent on estimated wind conditions.

According to another aspect of the invention a wind turbine propeller includes: a first and second set of stacked blades having a common axle for rotation, each such blade in the stacked blade set projecting radially (R) from an associated hub, wherein the first set of stacked blades is adapted to rotate (r) in angular relation to the second set of stacked blades via a corresponding hub, thereby forming a variably adjustable combined cross-section dependent on estimated wind conditions.

According to another aspect of the invention, a wind turbine propeller includes: a plurality of blades, the plurality of blades having a length projecting radially from a hub and adapted to rotate about a portion of the hub axle, each of the blades having an associated blade pivotally mounted on the length such that pivotally rotating the associated blade alters one of the radius of the propeller or the cross-section of the propeller dependent on estimated wind conditions.

According to another aspect of the invention, a method for controlling the threshold of destruction in a wind turbine propeller includes: rotating a plurality of adjoining overlapping blades according to estimated wind conditions, each blade projecting radially from a hub adapted to rotate in angular relation to adjacent adjoining blades; detecting wind speed and determining: if the estimated maximum wind speed decreases, rotating the overlapping blades in a direction to increase the combined cross-section of the overlapping blades; and if the estimated maximum wind speed increases, rotating the overlapping blades in an opposing direction to decrease the combined cross-section of the overlapping blades.

According to another aspect of the invention a method for controlling the threshold of destruction in a wind turbine propeller includes: rotating a plurality of adjoining blades according to estimated wind conditions, each blade projecting radially from a hub adapted to rotate in angular relation to adjacent adjoining blades; and each blade having pivotally mounted on the length an associated blade such that if the wind speed decreases, pivotally rotating the associated blade to increase one of the radius or the cross section of the propeller, and if the wind speed increases, pivotally rotating the associated blade to decrease one of the radius or the cross section of the propeller.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and wherein:

FIGS. 2a, 2a', 2b, and 2c illustrate various front and side elevation views of a blade apparatus according to an embodiment of the present invention;

DETAILED DESCRIPTION

Figure 1:
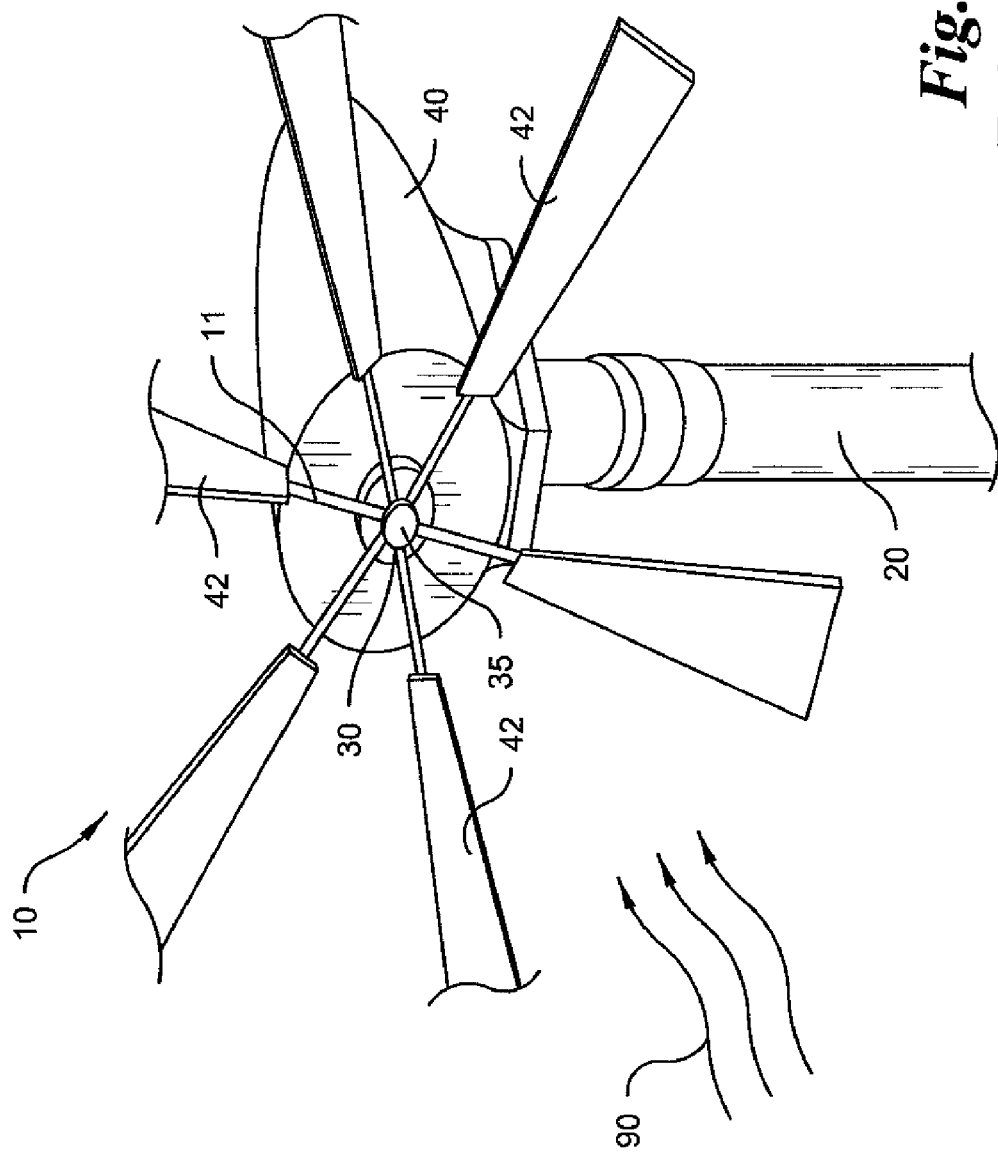
FIG. 1 is a perspective view of a prior art wind turbine.

The figures and descriptions of the present invention have been simplified to illustrate elements that are relevant for a clear understanding, while eliminating, for the purpose of clarity, many other elements found in wind turbine technology and methods. Those of ordinary skill in the art may recognize that other elements and/or steps may be desirable in implementing the present invention. However, because such elements and steps are well known in the art, and because they do not facilitate a better understanding of the present invention, such elements and steps are omitted for brevity.

FIGS. 2a-2c illustrate a propeller 11 in accordance with an embodiment of the invention wherein a plurality of overlapping blades 42a-n, project radially from a hub 30 that rotates about a hub axle 35 (see, FIG. 2c). One or more of the overlapping blades 42a-n, under the control of a controller that computes conditions related to the wind velocity, combine to form a cross-section 41 adapted to receive wind traveling toward the blades and generally parallel to each blade axis Z. The blades are pivotally adapted on the hub 30 to rotate about an axial portion (i.e., the hub axle 35) in order to vary the cross section of the overlapping blades dependent on wind speed.

With further reference to FIGS. 2a-2b the wind turbine propeller 11 has adjoining overlapping blades 42a-n, each blade 42n projecting radially R from hub 30. In one embodiment the blades are adapted to rotate r degrees on the hub 30 in angular relation to adjacent adjoining blades. This enables variably adjusting the combined cross-section 41. The cross-section can be adjusted along a direction perpendicular to the wind direction (traveling parallel toward the Z axis of the blades).

In another embodiment the hub 30 having blades fixed thereon rotates r degrees in angular relation to adjacent adjoining blades fixed to corresponding independently rotatable hub sections 30a, 30b, 30c. Each of the blades has a cross-section along its length L toward the hub axle 35. The blades are pivotally adapted to rotate about a the hub axle 35 to overlap a predetermined amount and thus vary the combined cross section. The degree of overlapping is adjusted dependent on wind speed. In one embodiment the adjoining overlapping blades 42a-n are associated into sets, with each set mounted on a separate hub 30 section (e.g. 30a, 30b, and 30c) for rotation along the axle 35. Rotating one or more of the separate hubs 30 through the angle "a" increases the overlapping cross sectional area.

Figure 2E:
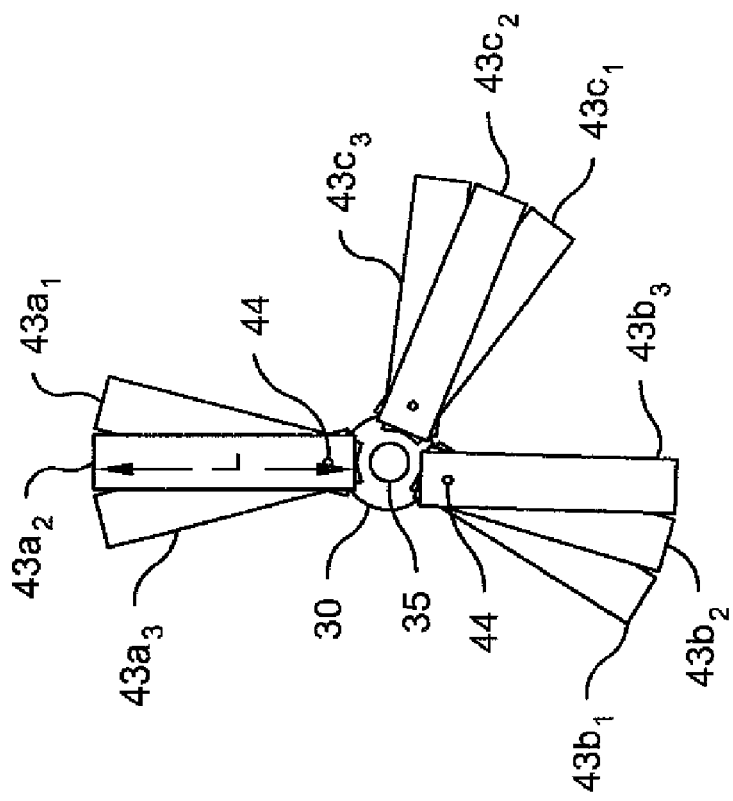
FIG. 2d-2e are front elevation views of a blade apparatus according to an embodiment of the present invention.
Figure 2D:
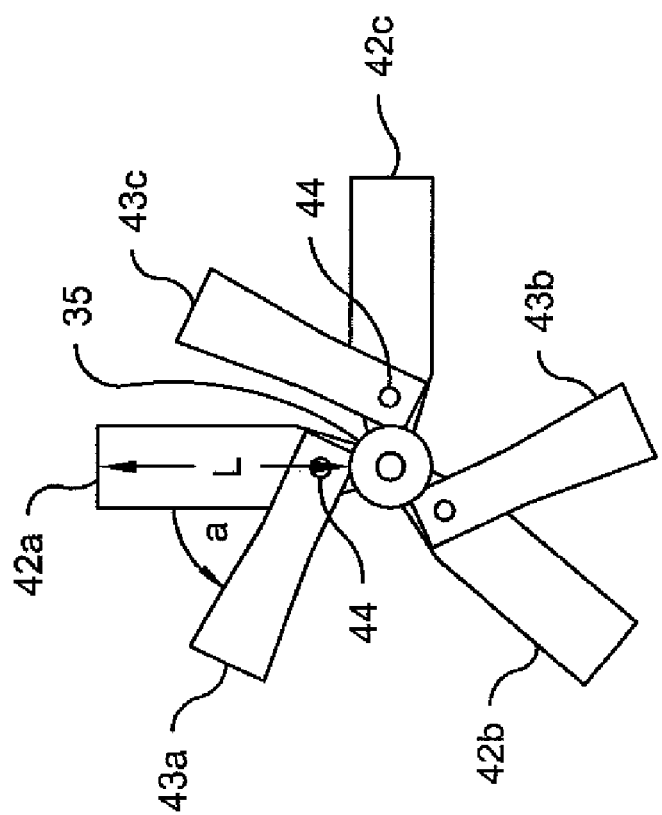

FIG. 2d represents another embodiment of the invention wherein wind blades 42a-c are fixed to hub 30. The blades 42a-c project radially from the hub axle 35. In this embodiment one or more blades 43a-c are mounted on corresponding blades 42a-c by a pivot 44. Pivot 44 may be embodied by a bushing and shaft, or other bearing surface and shaft, by way of example only. The pivot 44 mount of blades 43a-c on the length portion of the corresponding blade 42a-c allows the combined blades to alter the cross section of the propeller 11 as it faces into the wind.

In FIG. 2e there is depicted another embodiment wherein blades 43a-c are further divided into auxiliary blade sets such as $43a_1$, $43a_2$ and $43a_3$ fixed to a blade 42 via pivot 44 and which, as described above, blade 42 is mounted to hub 30 for rotation. The blades sets essentially fan out to produce increased cross section along the length L toward the hub axle 35. Depending on the distance from the hub axle 35 along L that the auxiliary set of blades $43a_1$, $43a_2$ and $43a_3$ are mounted onto blade 42, the auxiliary set of blades can act to increase the effective radius of the propeller 11. Turning to the embodiment of the invention depicted in FIG. 2f, the mounting of the auxiliary blades near the distal end of the blade 42 alters the radius of the wind turbine propeller 11 as well as changes the cross-section adapted to receive wind traveling generally parallel to each blade axis. The increase in radius of the propeller 11 is achieved by increasing the effective length of the combined blade 42 and the associated auxiliary blade. As previously described, the blades 42 rotate about a portion of hub axle 35 dependent on wind speed. In this embodiment blades 43a-c are mounted on corresponding blades 42a-c utilizing pivot 44 that serves to rotate r the blades 43a-c through an angle "a". In the example shown, opening the angle "a" rotates the blades 43a-c counterclockwise, effectively increasing the length of the propeller 11 radius. The pivotal mount of blades 43a-c on the length portion of the corresponding blade 42a-c allows the combined blades to alter either or both the radius and the cross section of the propeller 11 as it faces into the wind.

Figure 2G:
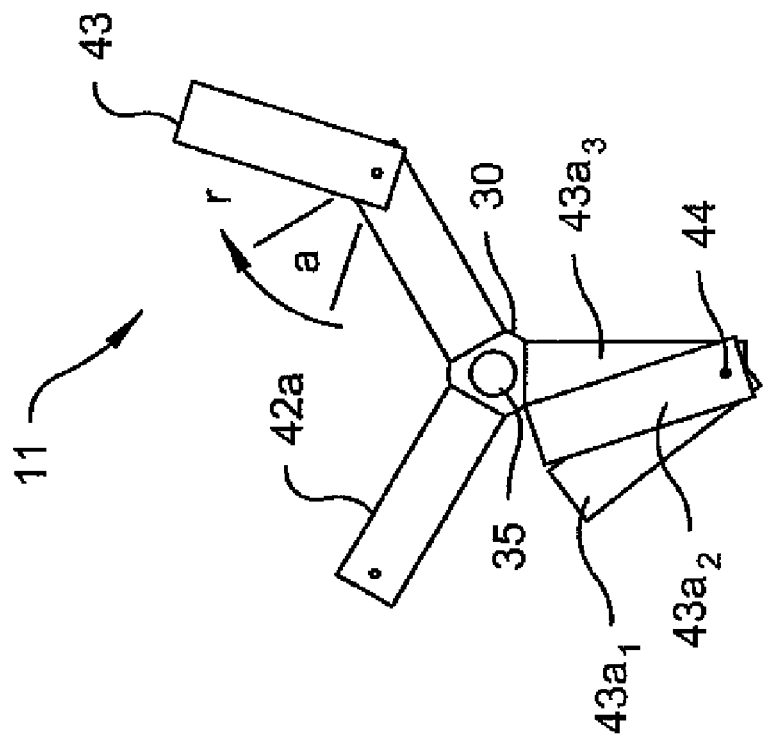
FIG. 2f-2g are front elevation views of a blade apparatus according to an embodiment of the present invention.

FIG. 2g illustrates another embodiment wherein blades 43a-c are further divided into sets such as $43a_1$, $43a_2$ and $43a_3$ fixed to an associated pivot 44. The blade sets essentially fan out to produce increased radius and cross section along length L toward the hub axle 35.

Figure 3:
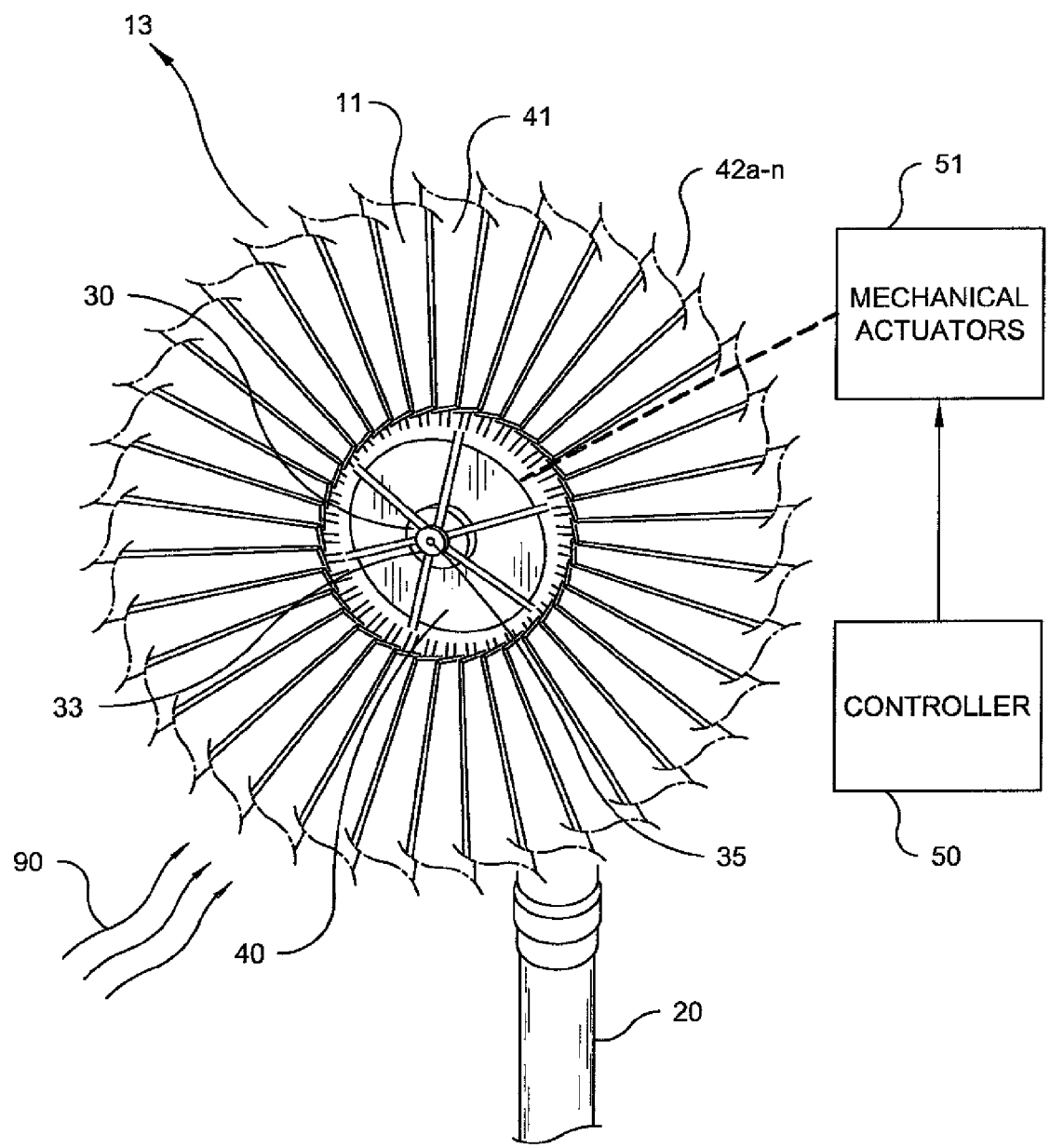
FIG. 3 is a perspective view of a wind turbine according to an embodiment of the present invention.

FIG. 3 illustrates a wind turbine apparatus 13 that includes a propeller 11 having the features described in connection with FIG. 2a-c. As indicated the blades 42a-n or sets thereof are rotated through an angle "a". A clutch 33 or other suitable mechanical apparatus (not shown) controls the rotary motion between the axle 35, hub 30 and electrical generator 40. The mechanical apparatus is adapted to rotate (r) the angular relation of the adjoining set of blades via the hub 30 relationship to the axle 35, thereby variably adjusting combined cross-section 41 in the direction of wind under the control of one or more mechanical actuators 51 that operate under the control of a controller 50.

Figure 4A:
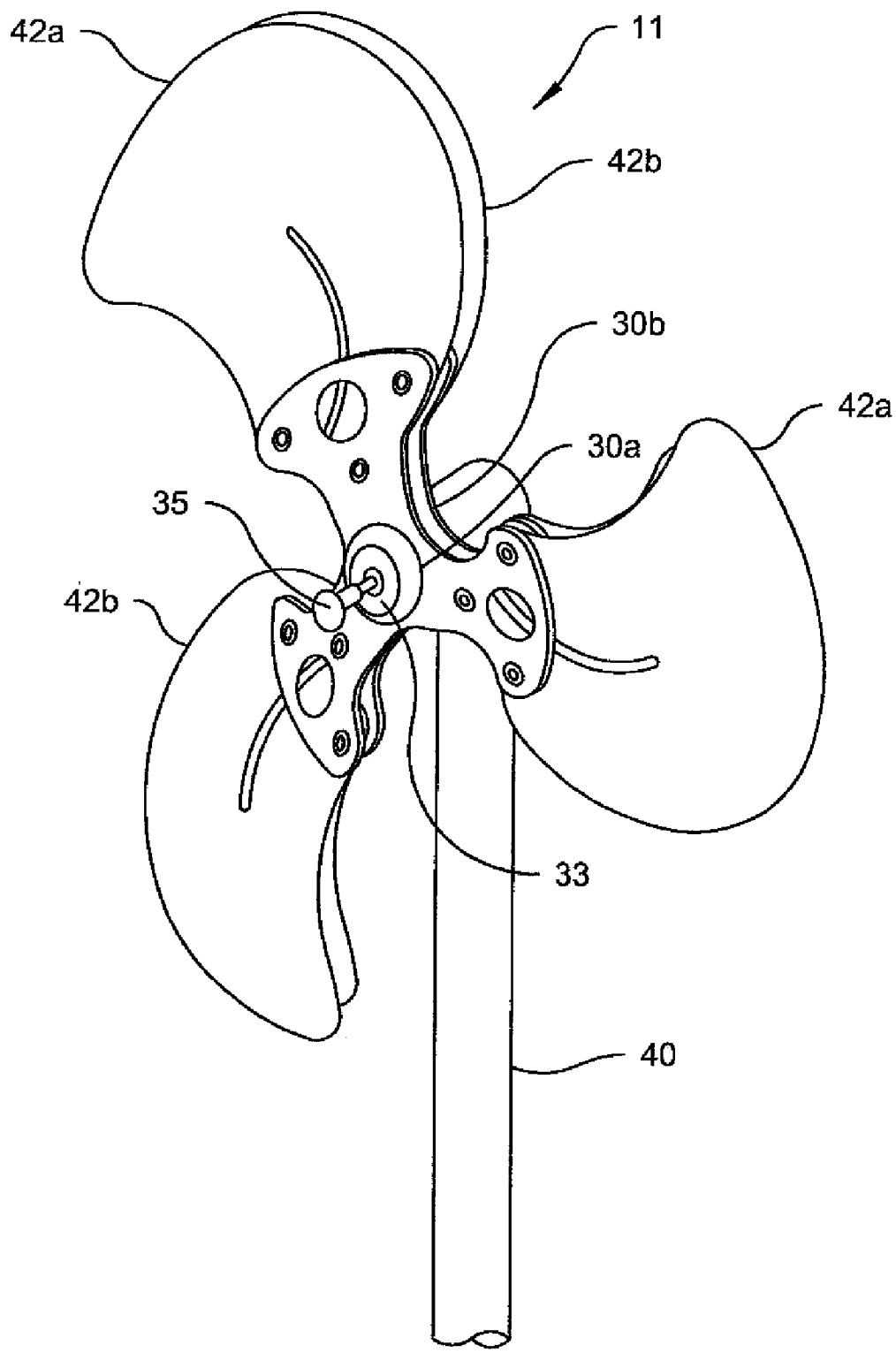
FIG. 4a is a perspective view of a wind turbine according to an embodiment of the present invention.
Figure 4B:
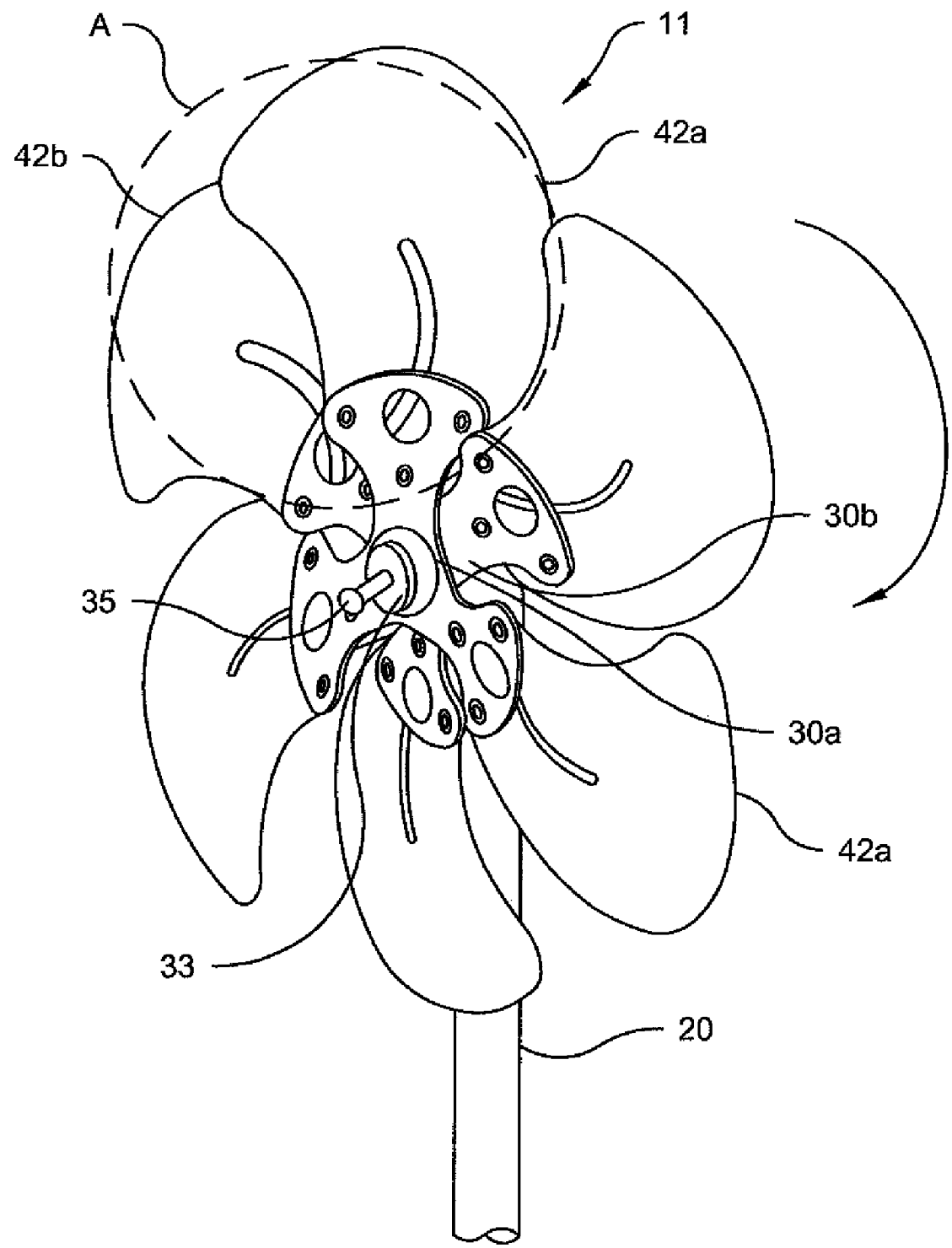
FIG. 4b is a perspective view of a wind turbine according to an embodiment of the present invention.
Figure 4C:
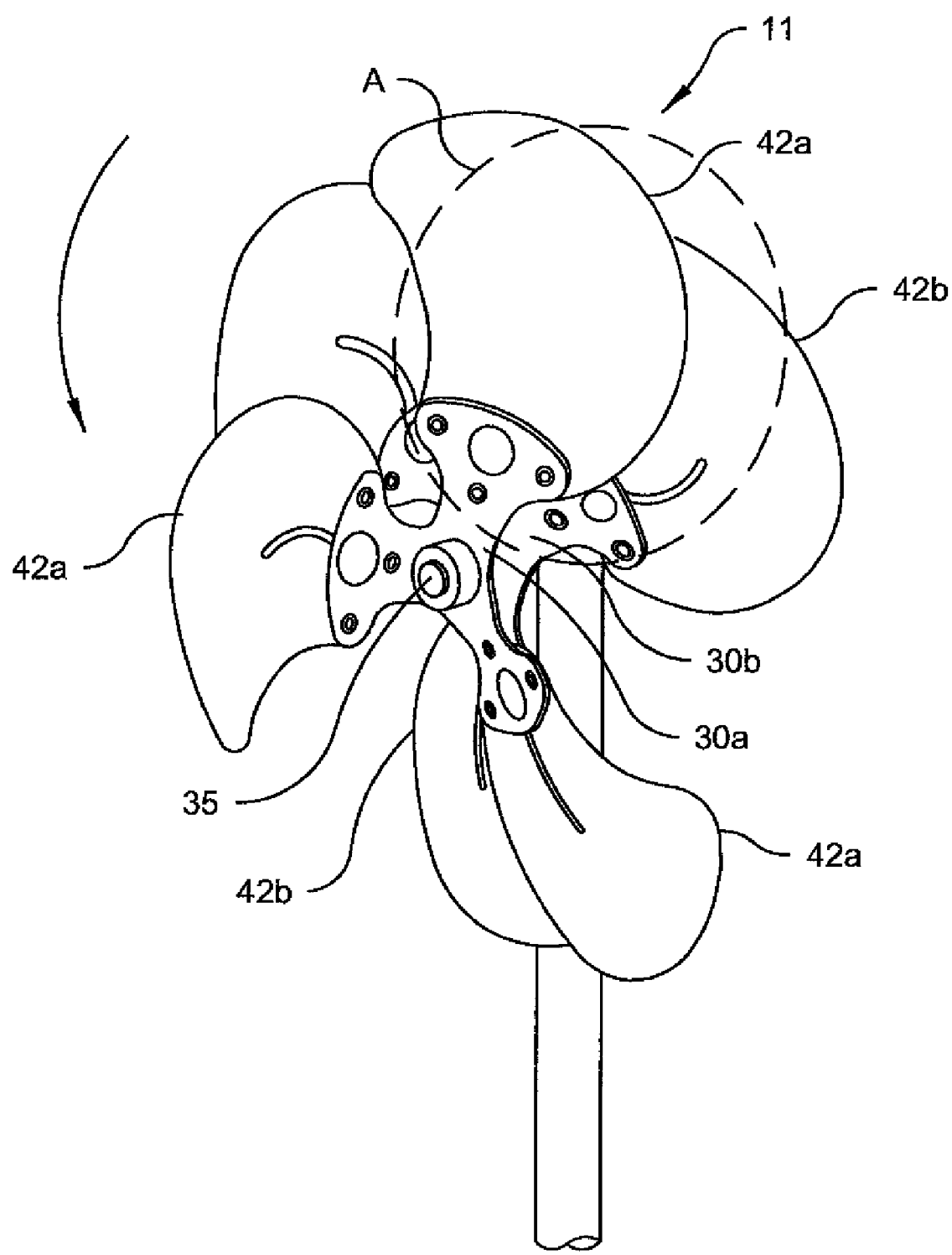
FIG. 4c is a perspective view of a wind turbine according to an embodiment of the present invention.
Figure 4D:
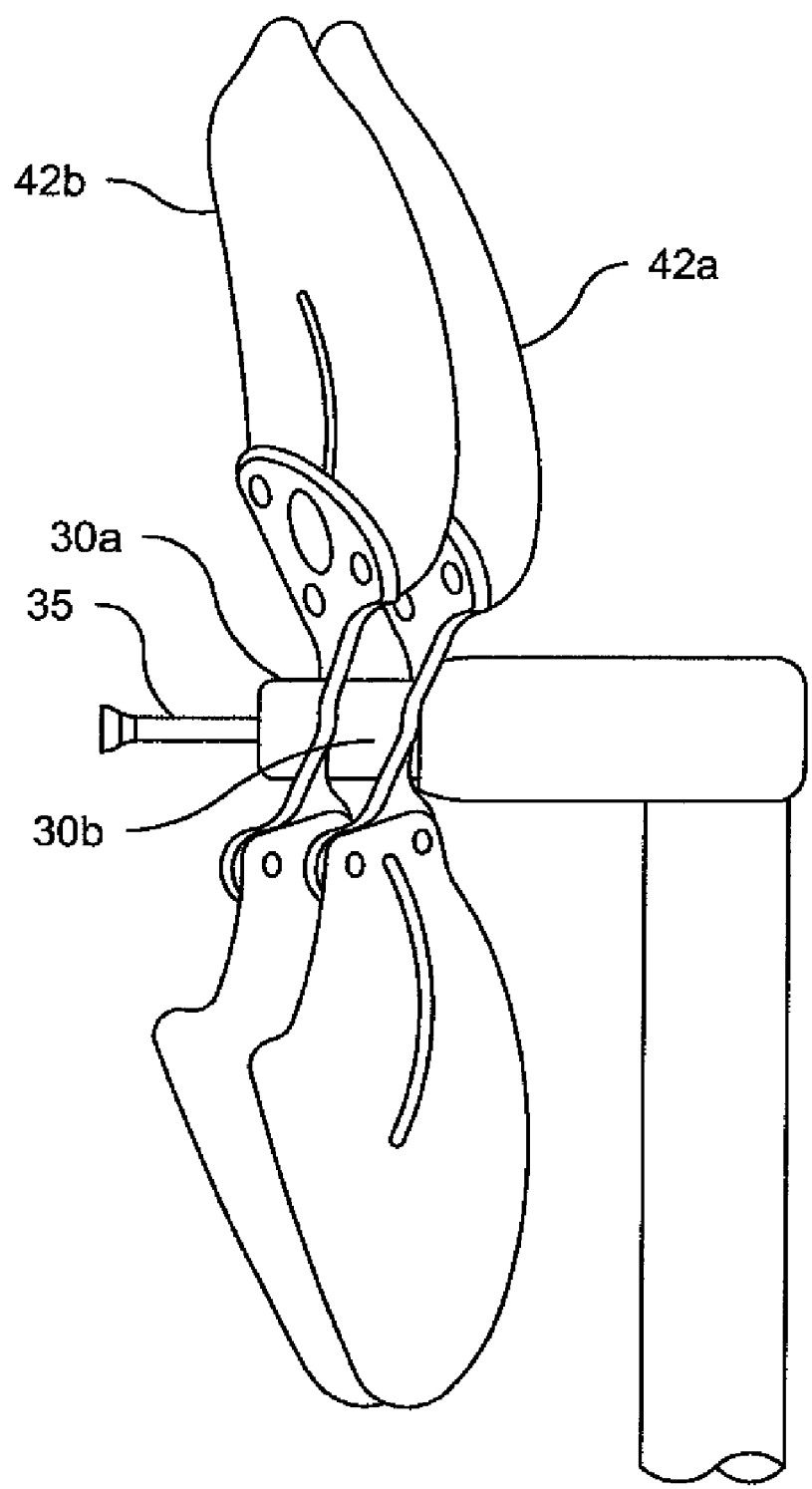
FIG. 4d is a perspective view of a wind turbine illustrating the hubs according to an embodiment of the present invention.
Figure 4E:
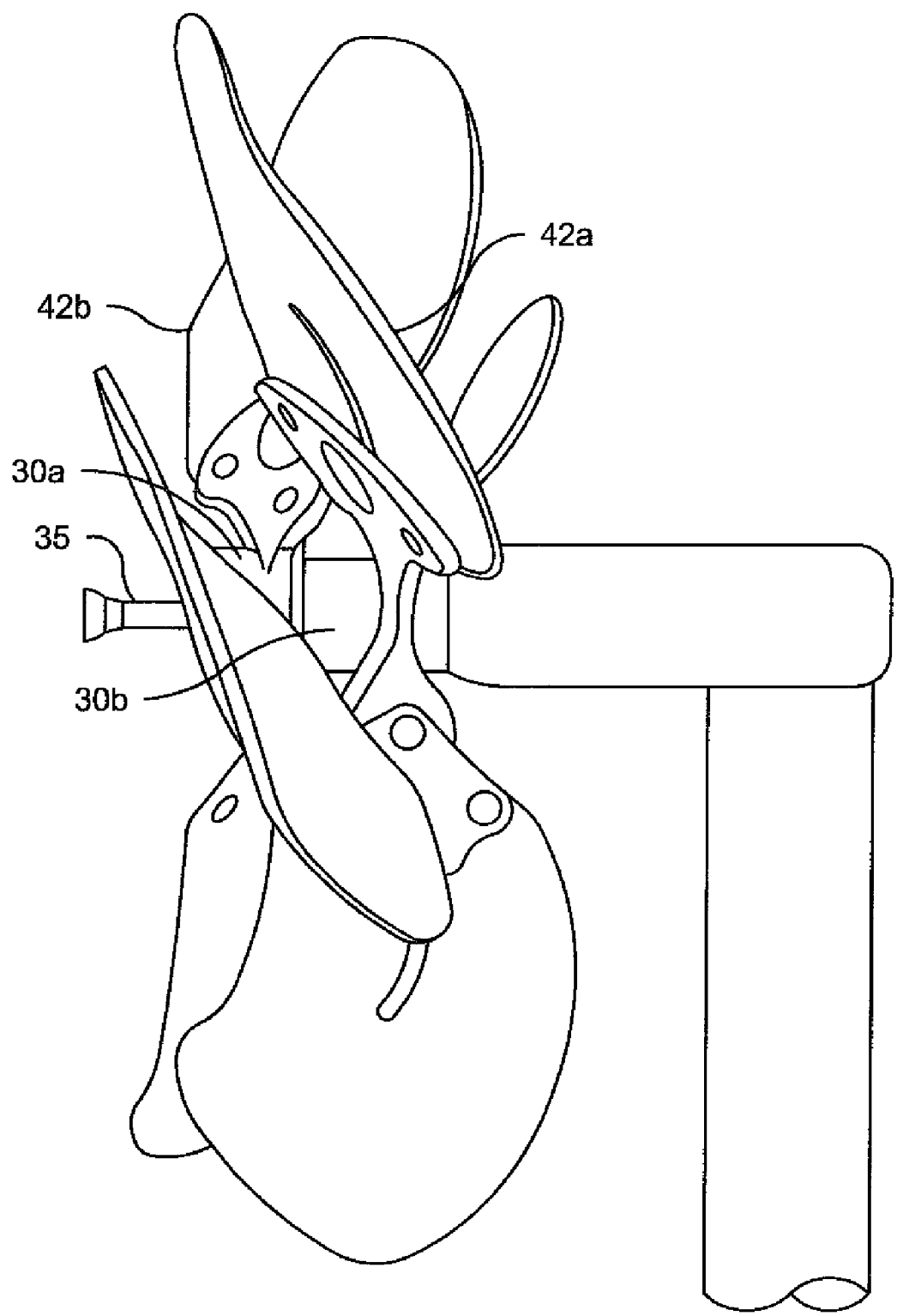
FIG. 4e is a perspective view of a wind turbine illustrating the hubs according to an embodiment of the present invention.
Figure 4F:
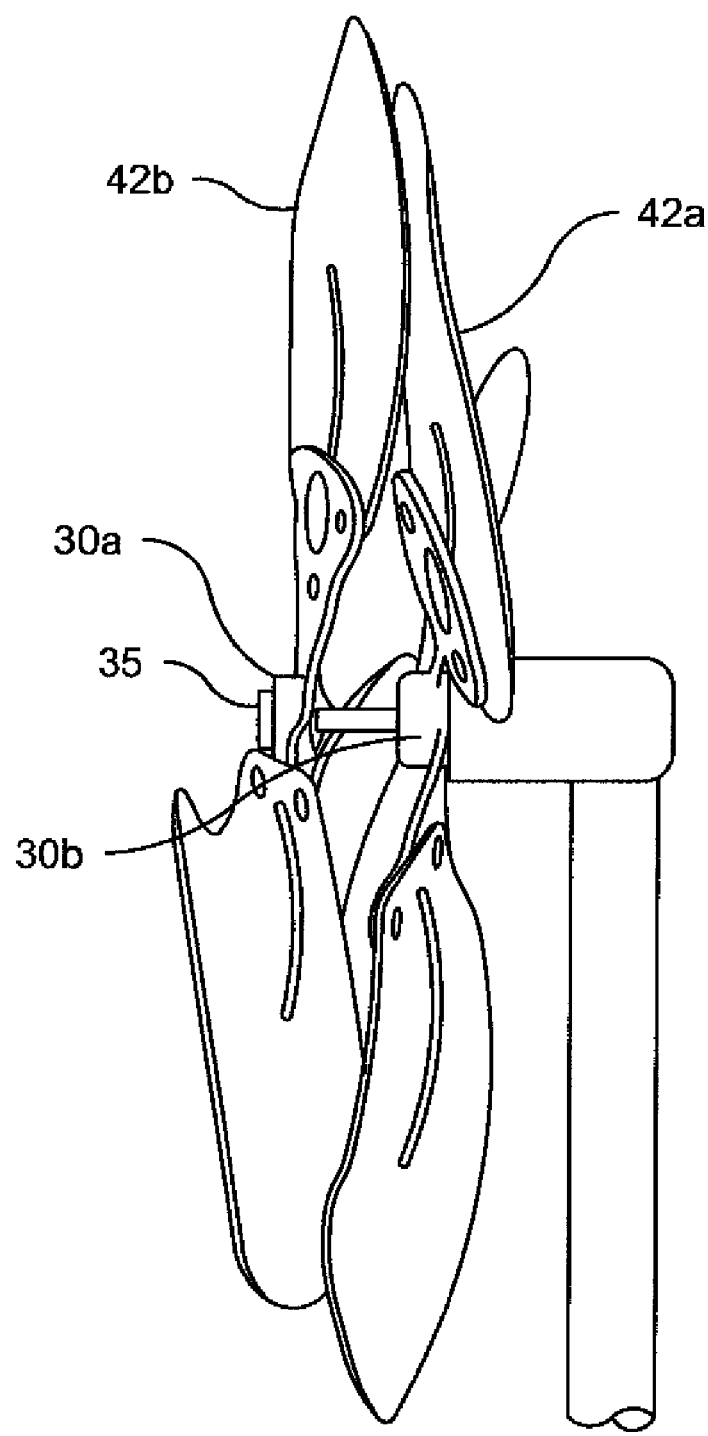
FIG. 4f is a perspective view of a wind turbine illustrating the hubs according to an embodiment of the present invention.

FIG. 4a illustrates a wind turbine propeller 11 having two or more coaxially associated sets of blades. In one embodiment a first set of blades 42a and a second set of blades 42b are in coaxial or stacked relationship on associated hubs 30a, 30b. The hubs 30a, 30b share a common axle 35 for rotation, the rotation dependent upon a clutch 33 condition. The stacked blades 42a, 42b rotate relative to each other dependent on the controller (FIG. 3). The movement of one stack of blades, such as blade stack 42a, relative to the other stack 42b, increases or decreases the cross-section along its length (L) projecting radially (R) from the axle (35). As further illustrated in FIGS. 4b and 4c, the first set of stacked blades 42a rotates (r) in angular relation to the second set of stacked blades 42b, thereby forming a variably adjustable combined cross-section designated area A for illustration in a direction of wind traveling toward the blades and generally parallel to each blade rotation axis dependent on wind speed. FIGS. 4d, 4e, and 4f illustrate the separate blade sets and corresponding hubs upon which the blade sets in FIGS. 4a, 4b, and 4c are mounted.

Figure 2F:
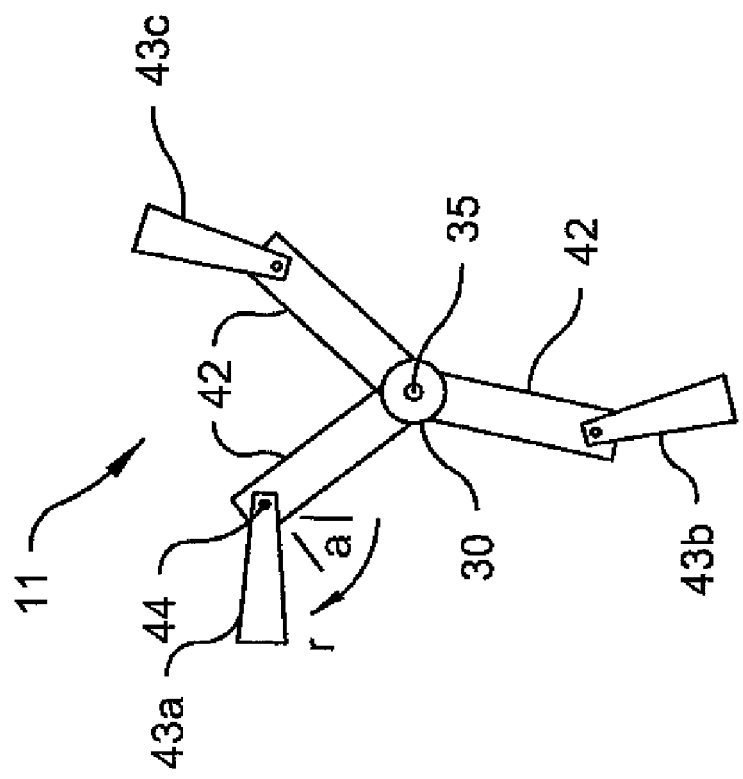
Figure 5A:
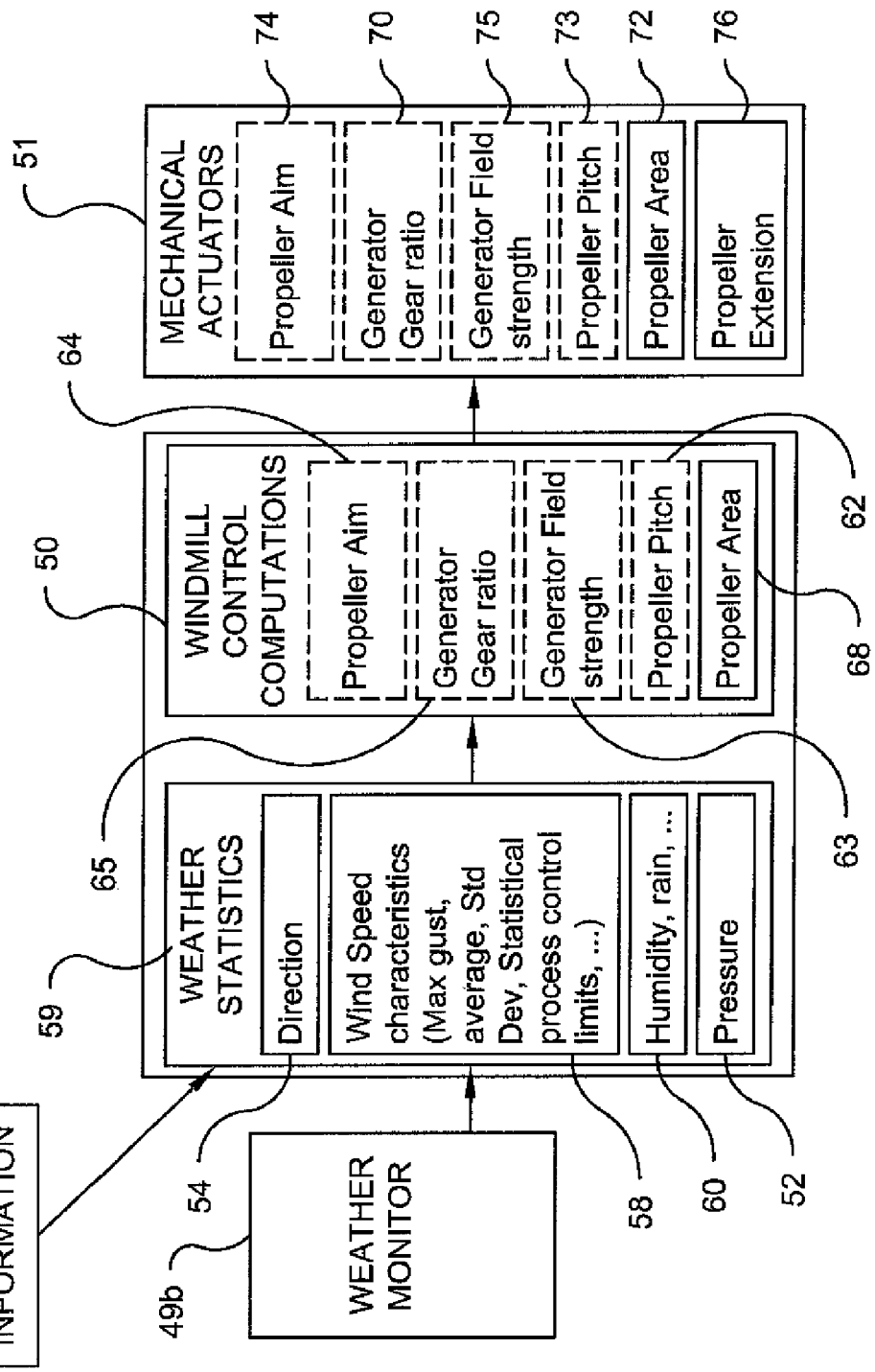
FIG. 5a is a block diagram of a control system for controlling a wind turbine according to an embodiment of the present invention.

In FIG. 5a an embodiment of the invention includes a wind turbine controller 50 that computes one or more of the optimum propeller blade or set of blade positions as described in the embodiments shown in FIGS. 2a-2c, FIGS. 2d-2e, FIGS. 2f-2g and FIGS. 4a-4c. In each instance the blades are configured to maximize the generator 40 power output and minimize the probability of propeller 11 destruction from wind. In accordance with the foregoing objectives, the controller 50 may be optionally programmed to compute the amount of blade overlap; that is, the amount of increase or decrease in cross sectional area in embodiments shown in FIGS. 2a-2e; or the controller 50 may be programmed to compute the amount of blade extension to achieve a desired increase in radius for propeller 11 as shown in FIGS. 2f-2g; or the controller 50 may be programmed to compute the amount of blade extension to achieve a desired movement through the radius (r) in the stacked blade set configuration shown in FIGS. 4a-4c. In computing the desired (i.e. target) parameters to produce the required blade state in each of the foregoing embodiments, the controller 50 utilizes data received from various weather sources such as remote weather information 49a and weather monitor 49b. These sources provide meteorological conditions such as wind direction 54, and wind characteristics 58 such as wind speed, wind gusts, and standard deviations in these meteorological conditions, as well as humidity 60 and atmospheric pressure 52. Utilizing the foregoing inputs, the controller 50 computes a propeller pitch 62 relative to the wind 90 field, a target generator field strength 63, an optimum propeller aim 64 relative to the wind 90 field, a target generator gear ratio 65 to attain a given power output from the generator 40, and a propeller cross sectional area or propeller radius extension as per the embodiments shown in FIGS. 2a-2c, FIGS. 2d-2e, FIGS. 2f-2g and FIGS. 4a-4c. It is understood that these control computations are based on various factors, including the particular windmill's design parameters, structural configuration, target safety margins, and the like.

Figure 5B:
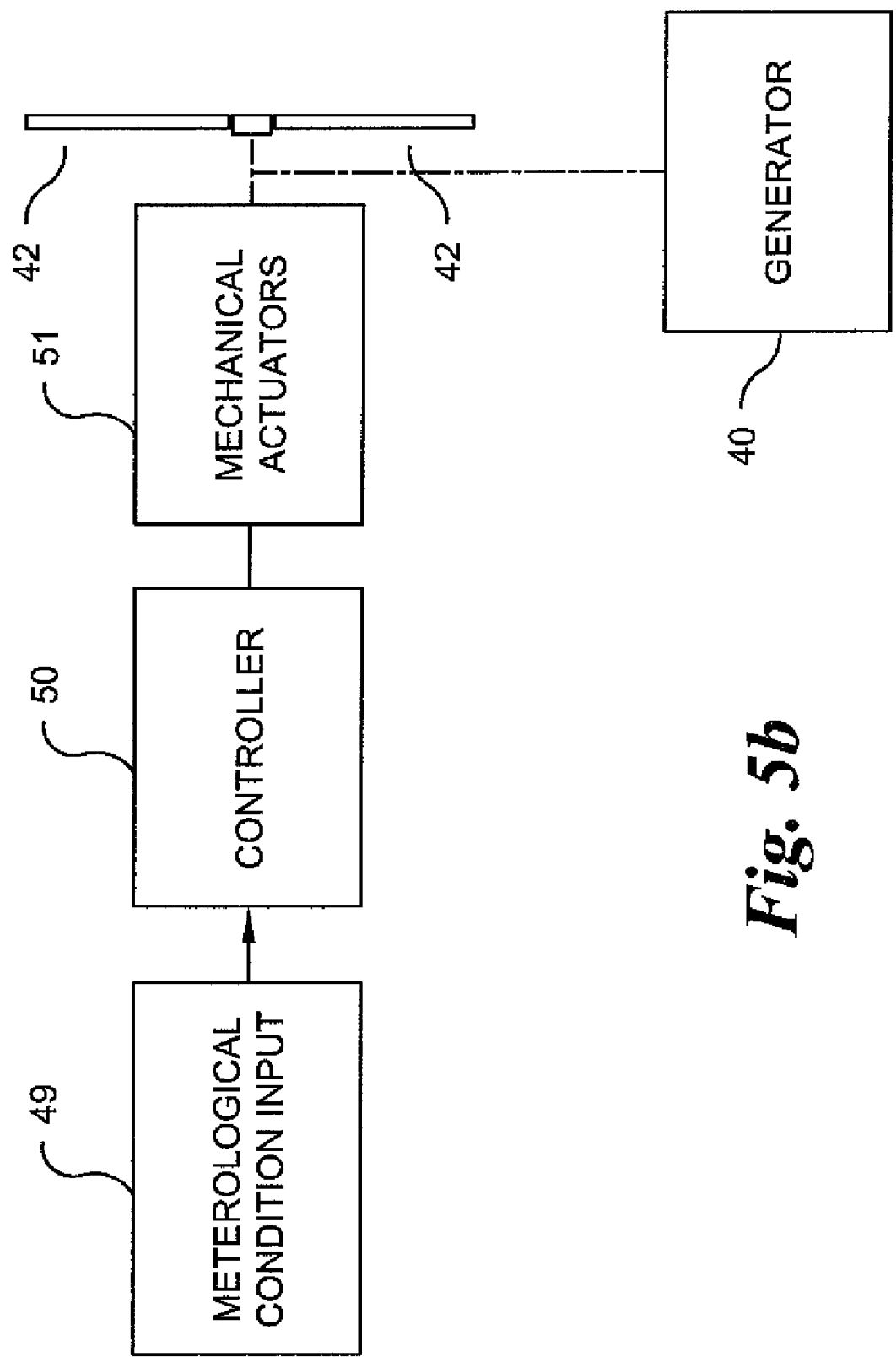
FIG. 5b is a block diagram showing inputs and outputs of functional components of a wind turbine system according to an embodiment of the present invention.

In FIG. 5b inputs from meteorological condition input 49 (a combination of remote weather information 49a and weather monitor 49b) feed the controller 50 having output signals that serve as inputs to mechanical actuators 51 to control the propeller blades 42 in the manner previously described. With reference to FIG. 5a, the mechanical actuators output a generator transmission gear ratio 70 that feeds the generator 40 mechanical control to provide the desired (i.e. target) gear ratios to produce desired (i.e. target) power output from the generator 40. Additional mechanical actuators 51 outputs can include propeller pitch output 73 to control the propeller 11 pitch, a propeller aim control output 74 and a generator field strength control 75. Mechanical actuators 51 include an output 72 indicative of propeller area output to affect the angle of rotation of the blades 42a-n relative to each other as per the embodiments shown in FIG. 2a-2c, FIG. 2d-2e, FIGS. 2f-2g and 4a-4c. In the embodiments shown therein changes in the output 73 indicative of propeller pitch serves to vary the angle "a" of each of the blades or blade sets dependent on wind speed. Optionally, mechanical actuators 51 outputs further include a propeller radius extension 76 to vary the angle of the blades 43a-c through the angle "a" relative to the blade 42a-c as per the embodiments shown FIGS. 2f-2g. Electromechanical devices that receive electrical input based upon meteorological conditions and control physical devices in accordance with various processes dependent upon meteorological conditions are well known by those of ordinary skill in the electromechanical engineering arts and are not further described for brevity.

Figure 6:
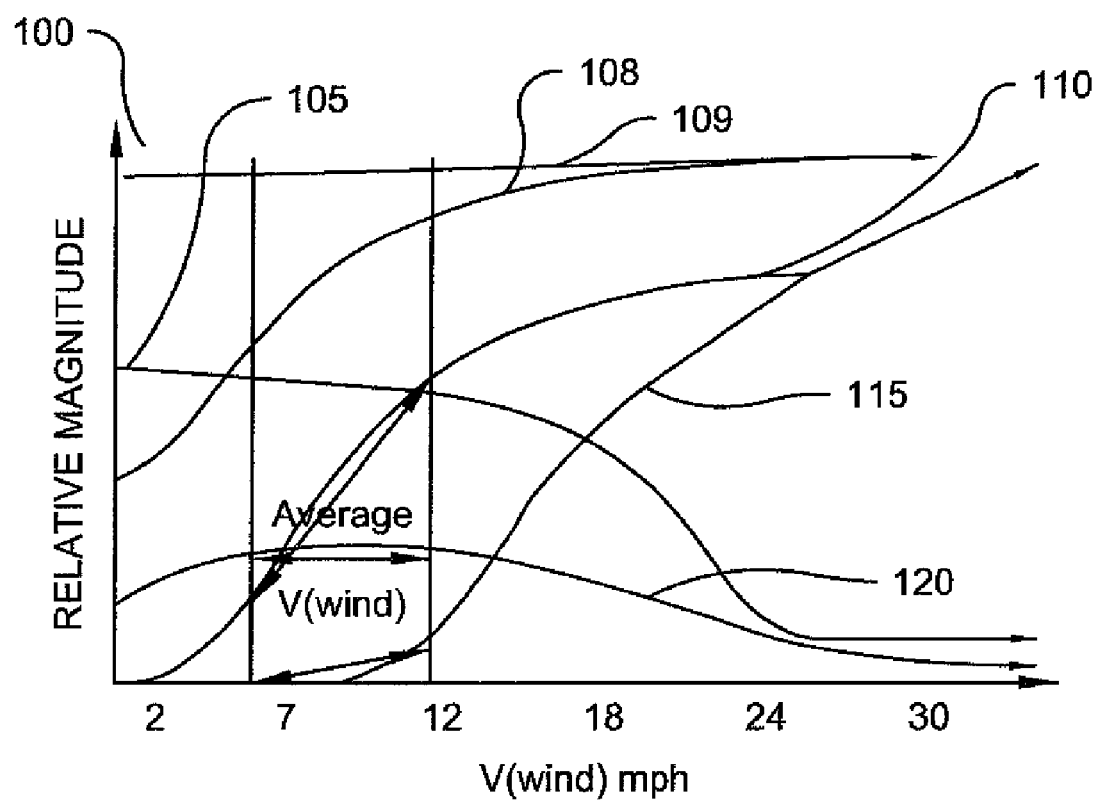
FIG. 6 shows graphs depicting various wind speed probabilities, where a corresponding threshold of destruction is controlled to produce increased output power according to wind speed and other conditions.

FIG. 6 is a graph 100 that shows the relative magnitudes of various wind conditions against corresponding wind velocity experienced by wind turbine 13, such as average wind velocity 120. By way of example, curve 109 shows a relatively constant threshold of wind destruction magnitude that will potentially destroy a propeller 11 without the variable blade configuration as described by embodiments of the present invention. In contrast, threshold of destruction (TOD) curve 108 depicts a variable threshold of wind destruction (as a function of wind speed) imposed on a propeller 11 in accordance with the variable area wind turbine embodiments as described in the present invention.

In curve 105 a relative blade area, as provided by changing the propeller blade cross sectional area in accordance with the embodiments of the invention is shown as a function of wind speed. This illustrates the relative change in area as a function of increasing wind velocity necessary to diminish the probability of destruction of the propeller 11. Curve 110 denotes the electrical power output from generator 40 with a variable cross sectional area in accordance with the embodiments of the present invention. In contrast, curve 115 illustrates the electrical power output from generator 40 without a variable output to change the blade cross section or the propeller radius.

Figure 7A:
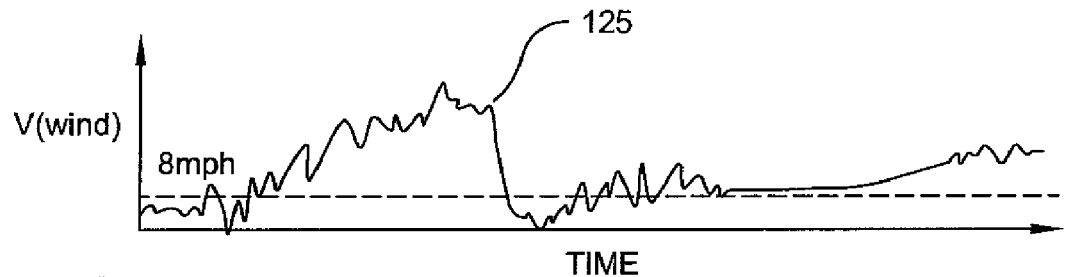
FIG. 7a-7d shows graphs depicting various wind conditions and influences related to embodiments of the present invention.
Figure 7B:
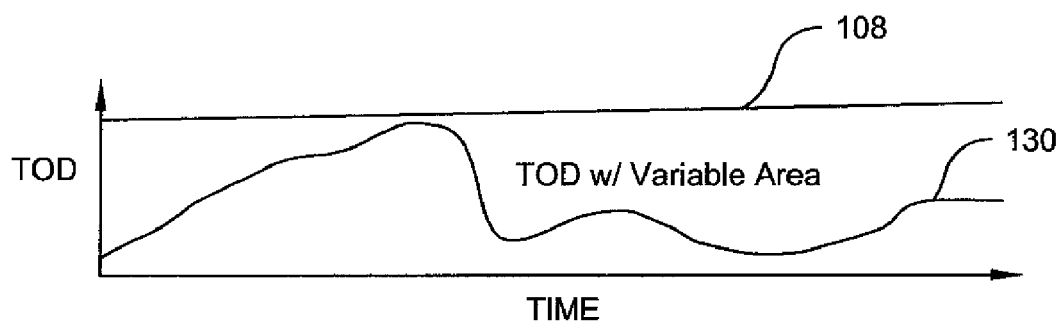
Figure 7C:
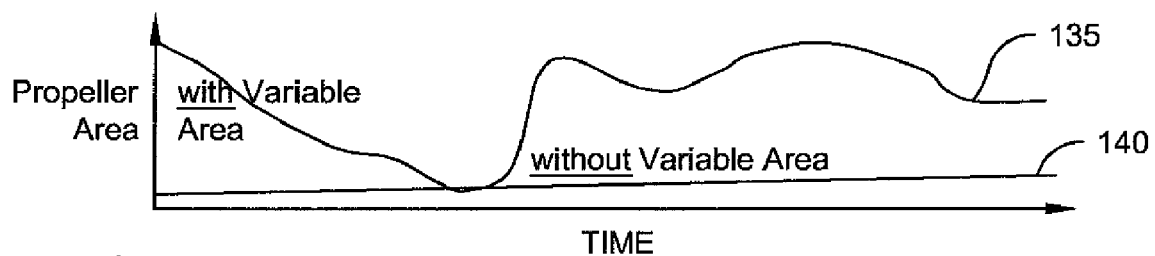
Figure 7D:
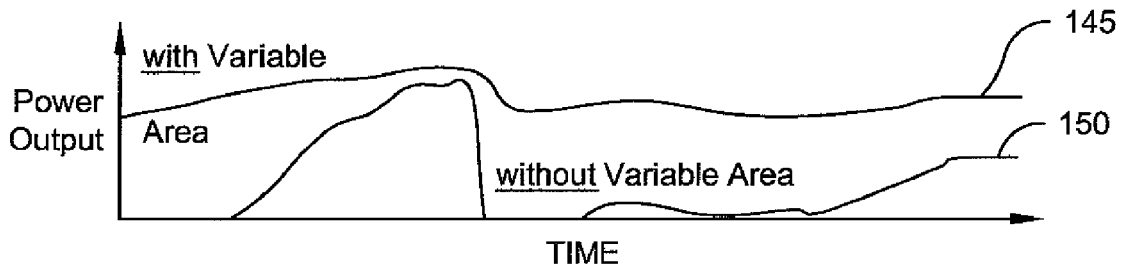

FIG. 7a represents a graphical plot of the relative magnitude of various wind conditions over time. FIG. 7b represents graphical plot of the relative magnitude the threshold of destruction 130 of a propeller 11, having a variable cross sectional blade area or variable radius according to the embodiments of the invention under the wind conditions plotted in FIG. 7a. Note that in FIG. 7a, as the wind shown in graph 125 rises from 8 miles per hour (mph) to a higher velocity the propeller 11 approaches threshold of destruction 131, but always remains below the threshold. FIG. 7c utilizes the same wind conditions as plotted in FIG. 7a to illustrate the magnitude of propeller 11 area as a function of wind velocity. According to embodiments of the invention, the propeller area facing the wind 135 changes as the wind velocity changes, as opposed to that area remaining constant. Finally, FIG. 7d utilizes the same wind conditions as plotted in FIG. 7a to illustrate the relatively stable magnitude of power 145 generated by propeller 11 in accordance with the embodiments of the invention described herein and in contrast to the widely varying magnitude of power 150 generated by propeller 11 without implementation of the invention to alter the blade cross section or radius.

Figure 8A:
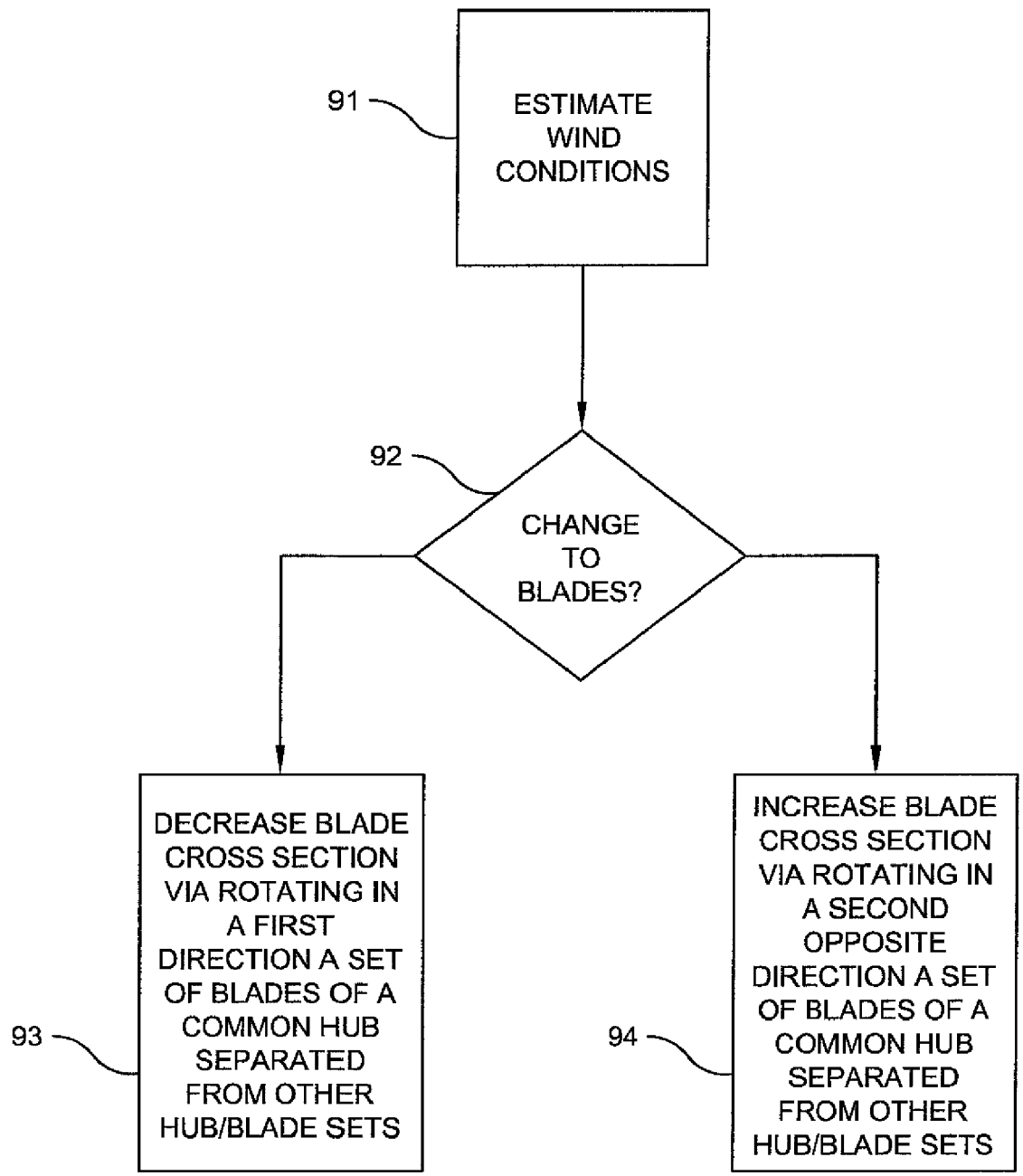
FIGS. 8a-8d are flow diagrams for controlling the threshold of destruction in a wind turbine propeller according to embodiments of the present invention.

With reference to FIG. 8a, an embodiment of the invention as shown in FIGS. 2a-2c and FIGS. 4a-4c is also drawn to a method for controlling the threshold of destruction 108 in a wind turbine 13 propeller 11 including: rotating the propeller having a set of coaxially associated hubs with associated blades or plurality of adjoining overlapping blades 42a-n according to an estimated wind conditions, each such a set of blades or adjoining blades 42*n* projecting radially R from the hub axle 35 adapted to rotate (r) in angular relation to a coaxially associated hubs with associated sets of blades or adjacent adjoining blades 42*a-n*; detecting (block 91) a change to estimated maximum wind and determining (block 92) if the blade area should be increased (block 94) or decreased (block 93) wherein if the estimated maximum wind has decreased, rotating the overlapping blades in an angular direction to increase one of the combined cross-section of the coaxially associated hubs with associated sets of blades or adjoining overlapping blades 42*a-n*; and if the estimated maximum wind has increased, rotating the coaxially associated set of blades or adjoining overlapping blades in a negative or opposing direction to decrease the combined cross-section of the overlapping blades 42*a-n*.

Figure 8B:
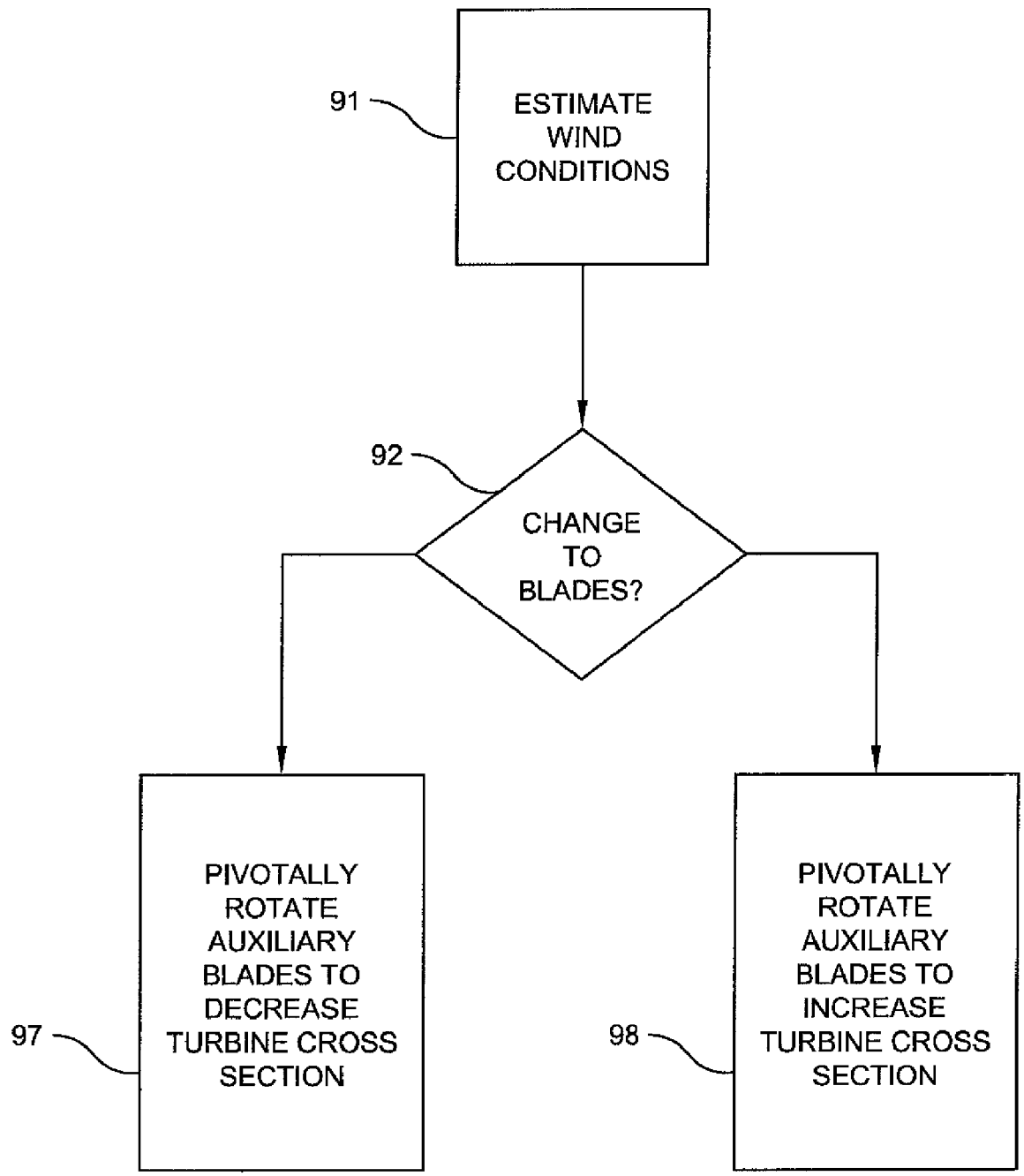

With reference to FIG. 8*b*, an embodiment of the invention as shown in FIG. 2*d*-2*e* is also drawn to a method for controlling the threshold of destruction 108 in a wind turbine 13 propeller 11 including: rotating the propeller having adjoining blades 42*a-n* according to wind speed, each blade 42*n* having an increasing cross-section 38 along its length projecting radially R from a hub axle 35 adapted to rotate r in angular relation to adjacent adjoining blades 42*a-n*; and each blade pivotally mounted on the length an associated blade such that pivotally rotating the associated blade alters the cross-section of the wind turbine as adapted to receive wind traveling parallel to each blade axis. The method includes detecting (block 91) estimated maximum wind and a determining (block 92) if the estimated maximum wind has increased or decreased. If the estimated maximum wind decreased, pivotally rotate (block 98) the associated blade to increase the cross section of the wind turbine; and if the estimated maximum wind increased, pivotally rotate (block 97) the associated blade to decrease the cross section of the propeller 11.

Figure 8C:
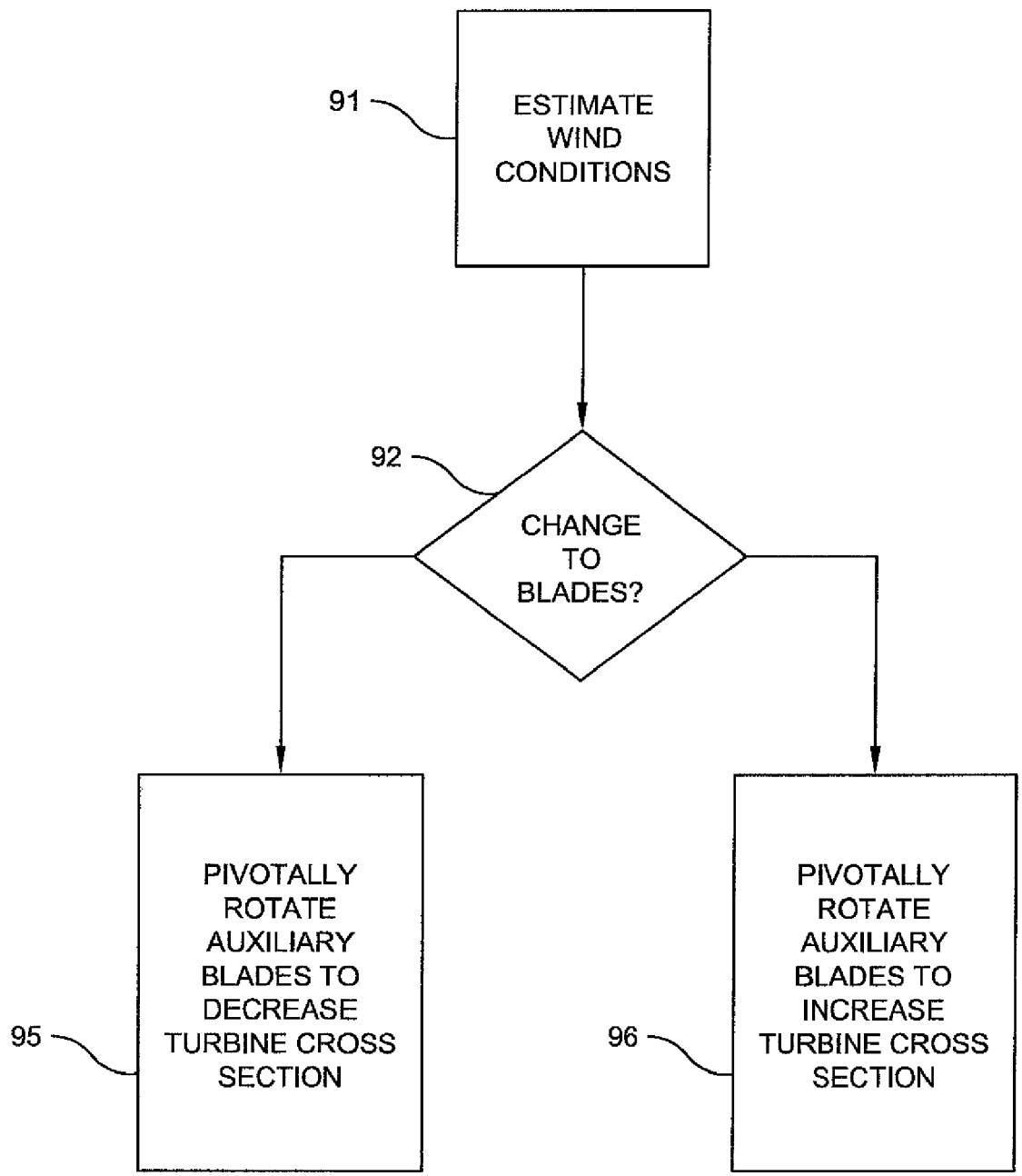

With reference to FIG. 8*c*, an embodiment of the invention as shown in FIGS. 2*f*-2*g* is also drawn to a method for controlling the threshold of destruction 108 in a wind turbine 13 propeller 11 including: rotating the propeller having a plurality of adjoining blades 42*a-n* according to estimated maximum wind, each blade 42*n* projecting radially R from a hub 30 adapted to rotate (r) in angular relation to adjacent adjoining blades 42*a-n*; and each blade pivotally mounted 44 on the length of an associated blade such that pivotally rotating the associated blade alters the radius of the wind turbine; detecting (block 91) estimated maximum wind and determining (block 92) if the wind has increased or decreased; wherein if the estimated maximum wind decreased, pivotally rotating (block 96) the associated blade to increase the radius of the wind turbine; and if the estimated maximum wind increased, pivotally rotating (block 95) the associated blade to decrease the radius of the propeller 11.

Figure 8D:
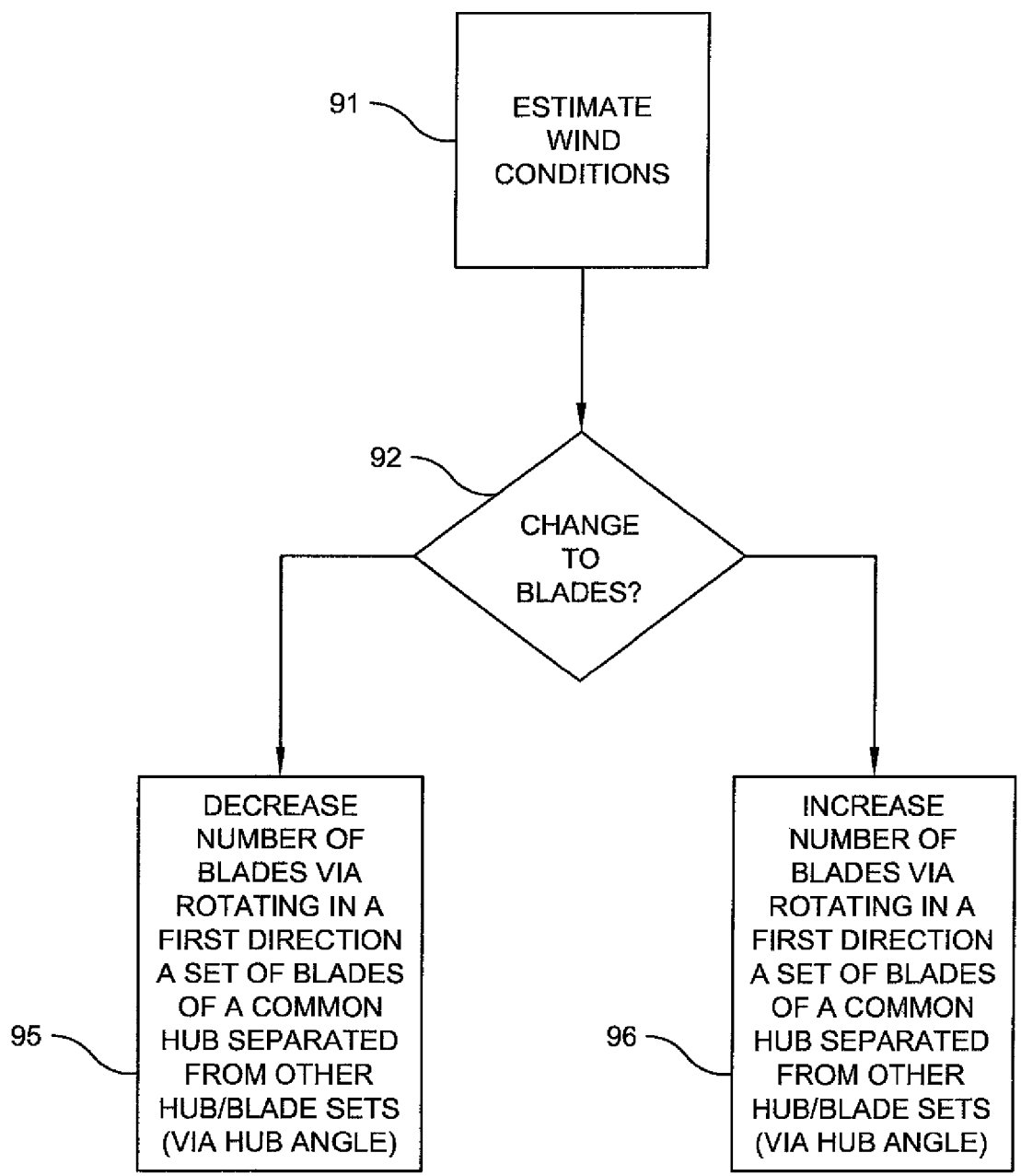

With reference to FIG. 8*d*, an embodiment of the invention as shown in is also drawn to a method for controlling the threshold of destruction 108 in a wind turbine 13 propeller 11 including: rotating the propeller with associated blades or plurality of adjoining overlapping blades 42*a-n* according to estimated maximum wind, each such a set of blades or adjoining blades 42*n* projecting radially R from the hub axle 35 adapted to rotate (r) in angular relation to a coaxially associated hub with associated sets of blades or adjacent adjoining blades 42*a-n*; detecting (block 91) estimated maximum wind and determining (block 92) if the estimated maximum wind has increased or decreased; wherein if the estimated maximum wind has decreased, then increasing the number of blades via the hub angle (block 96); and if the estimated maximum wind has increased, then decreasing (block 95) the number of blades via the hub angle.

With reference to FIGS. 5*a*-5*b* and FIGS. 8*a*-8*c*, it is understood that the processing and associated controllers and processors used in providing switching logic, calculations, signals and control for the various sensing of meteorological and/or controlling of the mechanical actuators can be implemented as analog or digital processes in hardware, software, firmware, or combinations thereof, respectively. Where the functionality selection is implemented in either software, firmware, or both, the processing instructions can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. Generally the software processes may exist in a variety of forms having elements that are more or less active or passive. For example, they may exist as software program(s) comprised of program instructions in source code or object code, executable code or other formats. This functionality may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals are signals that a computer system hosting or running the computer program may be configured to access, including signals downloaded through the Internet or other networks. Examples of the foregoing include distribution of the program(s) on a CD ROM or via Internet download.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A wind turbine propeller comprising:
   a plurality of overlapping blades, said blades projecting radially from a hub, said hub pivotally adapted to rotate about a hub axle for varying the cross section of said overlapping blades;
   wherein at least some of the overlapping blades combine to form a variable cross-section dependent on wind speed and adapted to receive wind traveling in a direction toward said blades.

2. The wind turbine propeller according to claim 1, wherein increasing wind speed decreases the combined cross-section of said overlapping blades.

3. The wind turbine propeller according to claim 1, wherein decreasing wind speed increases the combined wind speed cross-section of said overlapping blades.

4. The wind turbine propeller according to claim 1, wherein decreases in the combined cross-section of said overlapping blades reduces a threshold of turbine destruction.

5. The wind turbine propeller according to claim 1, wherein said overlapping blades are fixed to said hub.

6. The wind turbine propeller according to claim 1, further including an electric generator adapted to generate electricity dependent on a rotation of the hub axle through 360 degrees rotation.

7. The wind turbine propeller according to claim 1, further including a controller for computing one or more of the optimum combined cross-section of said overlapping blades and maximizing the generator power output.

8. The wind turbine propeller according to claim 7, wherein the controller utilizes data for at least one of wind speed, wind gusts, humidity, temperature, and atmospheric pressure to compute one or more of the optimum combined cross-section of said overlapping blades to avoid destruction of the propeller.

9. The wind turbine propeller according to claim 7, wherein the controller utilizes data to determine the optimum combined cross-section of said overlapping blades to maximize the generator power output and avoid propeller destruction from wind.

10. The wind turbine propeller according to claim 7, wherein the controller output is utilized to vary the combined cross-section of said overlapping blades.

11. The wind turbine propeller according to claim 7, wherein the controller output is utilized to vary the angle relative to the hub axle of each of blade relative to said wind speed.

12. The wind turbine propeller according to claim 7, wherein the controller is responsive to at least one of wind speed, wind gusts, humidity, temperature, and atmospheric pressure.

13. A method for controlling the threshold of destruction in a wind turbine propeller comprising:
rotating a plurality of adjoining overlapping blades according to wind speed, each blade projecting radially from a hub and adapted to rotate in angular relation to adjacent adjoining blades;
detecting wind speed and determining: if the detected wind speed decreases, rotating the overlapping blades in a direction to increase the combined cross-section of said overlapping blades and if the wind speed increases, rotating the overlapping blades in an opposing direction to decrease the combined cross-section of said overlapping blades.

14. The method according to claim 13, further including maximizing the generator power output of said wind turbine and avoiding propeller destruction from wind dependent on an increasing wind speed.

15. The method according to claim 13, further including maximizing the generator power output by increasing the combined cross-section of said overlapping blades dependent on decreasing wind speed.

16. The method according to claim 13, wherein detecting the wind speed includes detecting wind gusts.

17. The method according to claim 13, wherein detecting the wind speed includes computing humidity, temperature, and atmospheric pressure.

18. A wind turbine propeller comprising:
a first and second set of stacked blades having a common axle for rotation, each such blade in the stacked blade set projecting radially from an associated hub,
wherein the first set of stacked blades is adapted to rotate in angular relation to the second set of stacked blades via corresponding associated hub, thereby forming a variably adjustable combined cross-section dependent on wind speed in a direction of wind traveling toward said blades and generally parallel to each blade rotation axis.

19. A wind turbine propeller comprising:
a plurality of blades, said plurality of blades having a length projecting radially from a hub and adapted to rotate about a portion of the hub axle, each of said blades having an associated blade pivotally mounted on said length such that pivotally rotating the associated blade alters one of the radius of the propeller or the cross-section of the propeller along a direction parallel to the axis of rotation of the hub axle dependent on wind speed.

20. A method for controlling the threshold of destruction in a wind turbine propeller comprising:
rotating a plurality of adjoining blades according to wind speed, each blade having a length and projecting radially from a hub adapted to rotate in angular relation to adjacent adjoining blades; each blade having pivotally mounted on said length an associated blade such that if the wind speed decreases, pivotally rotating the associated blade to increase one of the radius or the cross section of the propeller, and if the wind speed increases, pivotally rotating the associated blade to decrease one of the radius or the cross section of the propeller.

\* \* \* \* \*